Jan. 29, 1963 W. E. BAKER 3,075,348
IMPROVED HEAT MOTOR ACTUATOR
Filed Feb. 17, 1960
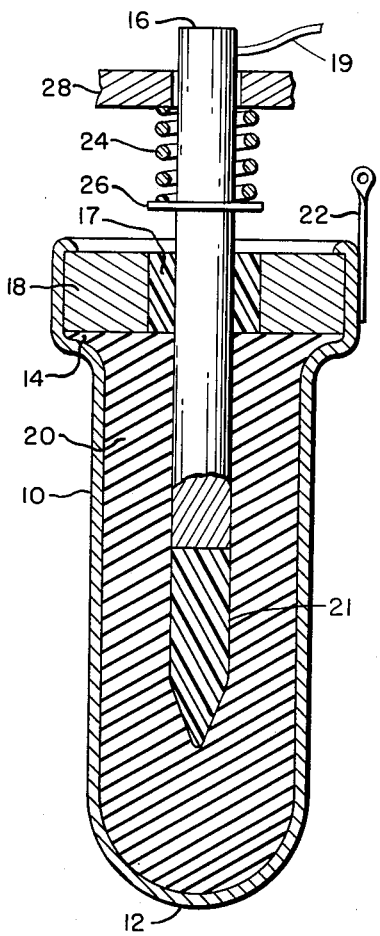
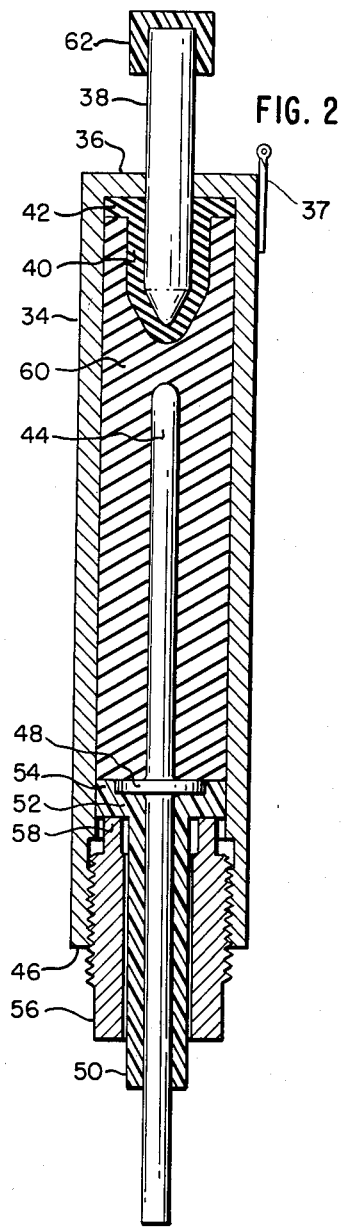
INVENTOR
WILLIAM E. BAKER
BY
*Kenway, Jenney, Witter & Hildreth*
ATTORNEYS

United States Patent Office 3,075,348
Patented Jan. 29, 1963

3,075,348
IMPROVED HEAT MOTOR ACTUATOR
William E. Baker, Wellesley, Mass., assignor to Standard-Thomson Corporation, Waltham, Mass., a corporation of Delaware
Filed Feb. 17, 1960, Ser. No. 9,226
6 Claims. (Cl. 60—23)

This invention relates to actuators generally of the type wherein heat energy is converted to mechanical energy and, more particularly, to actuators of the general type comprising a movable actuating member or pin, a quantity or body of non-metallic expansible-contractible material which will undergo volume change in response to changes in its temperature, said material being constructed and arranged relative to the actuating member to apply a force on the actuating member to move the same in an actuating direction in response to temperature change of the material, and electrically energizable means for applying heat to the expansible-contractible material.

Actuators of the foregoing general type have found application as so-called "heat motors." In general, the prior art constructions include a heating element distinct from but in heat transfer relation with the expansible-contractible material. Such a heat motor may be placed remotely from a control position to which it may be connected by an electrical circuit. When it is desired to actuate the motor, electrical current may be passed through the circuit to energize a heating coil or the like. The resulting change in temperature of the thermal responsive material will effect a volumetric expansion thereof which will effect movement of the actuating member relative to an associated device to be controlled, such as a valve.

The heat required for expansion of the thermal-responsive material is typically supplied in the prior art by an electric resistance heating element, such as a coil or the like, which is disposed adjacent, around, or within the thermal-responsive material. When it is desired to increase the response rate of the actuator, or, in other words, when it is desired to move the actuating member at an increased speed, larger amounts of current may be passed through the heating element in order to increase the rate of temperature rise of the thermal-responsive material. It will be recognized that the portions of the thermal-responsive material closest to the heating element will be at a substantially higher temperature than more remotely positioned portions of the thermal-responsive material. Because of this concentration of heat next adjacent the heating element, there are practical limitations on the amount of current which may be passed through the heating element without tending to cause burning and/or breakdown of the thermal-responsive material. Correspondingly, there are practical limitations on the speed or response which may be obtained from an actuator of the general type described merely by the increase in current through the heating element.

The aforedescribed problems are overcome in a novel actuator described and claimed in United States application Serial No. 9,225 entitled Actuator and filed February 17, 1960, now abandoned. In the actuator of the copending application, the movement of the actuating member is effected by a quantity of thermal-responsive material which is electrically conductive and which has an appropriate resistance value whereby when electrical current is passed through the material the $I^2R$ losses in the material will result in a rise in temperature of the material. Thus, the provision of a separate heating element is obviated. When the thermal-responsive material is connected to a source of electrical power, it will act, in effect, as a resistance heating element to raise its own temperature, which will cause volumetric expansion of the material to provide movement of the actuating member. The thermal-responsive material, therefore, not only serves to effect movement of the actuating member but, further, in itself provides resistance heating means to actuate the device. Specific preferred examples of electrically conductive, thermal-responsive materials are set forth in the aforedescribed copending application as a wax-like material or a silicone liquid which carries a quantity of finely divided graphite.

The present invention is concerned with novel improvements on an actuator generally of the type covered by the aforedescribed copending application and has as an object thereof the provision of an improved actuator of the type covered by the aforedescribed copending application which will provide additional advantages, particularly with respect to response rate and simplicity of construction.

In one aspect, this invention is concerned with the class of actuators of the general type described wherein the actuating member is at least partially received within a deformable and resilient force transmitting member, such as an elastomeric tube or sleeve closed at one end. The force transmitting member is contained within a housing and is surrounded by thermal-responsive material which upon heating will expand and act on the force transmitting member to force the actuating member outwardly of the housing. A preferred embodiment of an actuator constructed in accordance with this invention comprises an elongated actuating member one end portion of which is received within a housing containing electrically conductive, thermal-responsive, rubber bearing directly on the actuating member. Upon energizing of the thermal-responsive rubber from a source of electrical power, this material will act directly on the inner end of the actuating member to tend to move the actuating member outwardly of the housing. It can thus be seen that, in this aspect of the invention, the thermal-responsive material not only provides self-contained resistance heating means, as covered by the aforedescribed copending application, but also serves as the separate elastomeric force transmitting member previously utilized. A full understanding of this aspect of the invention as well as other aspects and advantages of this invention may be had by reference to the following description when taken in connection with the accompanying drawing, in which:

FIG. 1 is an elevational view, in section, of an actuator embodying the present invention; and FIG. 2 is an elevational view, in section, of another actuator constructed in accordance with this invention.

With reference to FIG. 1 of the drawing, an actuator of a type with which this invention is concerned comprises an elongated, rigid metallic housing 10 in the form of an elongated metal cylinder closed at its lower end 12 and open at its upper end. The upper end of the housing is enlarged to provide a generally radially extending shoulder 14 facing generally toward the open end of the housing. An actuating member 16, which in the specific embodiment shown comprises an elongated circular cross sectioned metal pin or rod, slidably extends through an insulating sleeve 17 mounted in a central aperture in a metal disc 18 which closes the upper end of the housing 10. The pin 16 extends coaxially of the housing, with the portion of the pin which is disposed within the housing being surrounded by a quantity of thermal-responsive material 20 which fills the space between the pin and the inner wall of the housing 10. The term "thermal-responsive material" as used herein and in the accompanying claims defines a material which will undergo volume change in response to a change in its temperature and preferably will exert forces on a body surrounded by such material in a manner similar to a fluid such as water.

In accordance with this invention, the thermal-responsive material 20 is an electrically conductive, resilient, thermal-responsive material, such as an electrically conductive rubber. The electrically conductive rubber is provided with a resistance such that upon passage of electrical current through the rubber, the rubber will act as a resistance heating element to raise its own temperature and thereby effect a volumetric expansion of the thermal-responsive material. I prefer to use an electrically conductive, thermal-responsive silicone rubber, inasmuch as the resistance value following deformation of the silicone rubber is more accurately predictable than as in the case with many other conductive rubbers. Also, the silicone rubber will provide a relatively low coefficient of friction with respect to the pin 16 so as to improve the operation of the device with respect to movement of the pin by expansion of the thermal-responsive material 20. The thermal-responsive material 20 is engaged directly with the inner portion of the pin 16, whereby a temperature caused expansion of the material 20 will result in the material 20 acting directly on the inner end of the pin 16 to tend to force the pin outwardly of the housing. In this connection, while the inner end of the pin may be squared or rounded, it is preferred that it be tapered as shown in the drawing.

In order to provide for connection of the electrically conductive material 20 to a source of electrical power, a terminal 22 is provided on the housing 10 and suitable means such as the flexible wire 19 are provided for connection of the metal pin 16 to a source of power. In this manner, there will be a flow of current through the material 20 and radially of the housing to provide for heating of the same. As shown in FIG. 1, where it is desired to provide for an automatic cut-off of the actuator at a predetermined limit position of the pin 16, the lower or inner end 21 of the pin may be fabricated of an electrically non-conductive material. It will be apparent that in the actuator of FIG. 1, when the pin 16 has been moved outwardly of the housing a predetermined distance, the electrical circuit between the housing and the pin will be broken so as to deenergize the device.

Resilient return means are preferably provided for the actuating member 16 in order to provide for return movement of the actuating member inwardly of the housing during contraction of the thermal-responsive material 20, such as will occur following deenergizing of the device. While the load driven by the actuating member may inherently or otherwise provide the return biasing force for the actuating member, in the embodiment shown in FIG. 1 a return spring 24 is provided for this purpose. The coil compression spring 24 is engaged between a shoulder or flange 26 on the portion of the pin 16 projecting beyond the housing 10 and an abutment 28 fixed relative to the housing 10.

In the embodiment of FIG. 2, the actuator comprises an elongated hollow metal shell or housing 34 closed at one end 36. An actuating member or pin 38 extends slidably through a central aperture in the closed end 36 of the housing so that at least a portion of the pin 38 extends coaxially within the housing. The inner end of the pin 38 is received within a longitudinally extending cavity of a deformable force transmitting member 40. More specifically, the force transmitting member 40 is a rubber sleeve closed at one end for receiving the tapered inner end of the pin 38. The other end of the sleeve is provided with a radially outwardly extending flange 42 which is bonded to the housing 40 at the closed end 36 thereof. A central electrode 44 is disposed coaxially within the housing 34 in alignment with the pin 38 and with the inner end of the electrode being spaced from but adjacent to the inner end of the force transmitting sleeve 40. The other end of the electrode extends outwardly of the open end 46 of the housing opposite the pin 38.

The electrode 44 is provided with a radially extending flange or shoulder 48 intermediate its ends and disposed inwardly of the housing 34. The flange 48 is received within a dished end portion of an insulating sleeve 50 surrounding the electrode 44 and extending from the flange 48 outwardly of the open end 46 of the housing. More specifically, the dished portion of the insulating sleeve 50 is formed by a flange or shoulder 52 extending radially outwardly from the inner end of the sleeve and terminating in an annular lip 54 slidably engaged with the inner wall of the housing 34 and extending inwardly of the housing to provide a recess for receiving the flange 48 in the pin 44. An externally threaded metal sleeve 56 is disposed coaxially and slidably over the insulating sleeve 50 and is threadably engaged with the inner wall of the housing 34 adjacent the open end 46 thereof. The end of the sleeve 56 disposed inwardly of the housing 34 is provided with an annular coaxial projection 58, the outer end of which bears upon the radially extending flange 52 on the insulating sleeve, whereby the inward threading of the metal sleeve 56 will result in corresponding movement of the dished portion of the insulating sleeve inwardly of the housing. The interior of the housing 34 between the dished portion of the insulating sleeve and the closed end 36 of the housing is filled with an electrically conductive, thermal-responsive, resistance heating conductive rubber 60, which preferably is a silicone rubber. In the device of FIG. 2, it will be observed that there is a relatively high ratio of thermal-responsive material 60 to the maximum stroke of the actuating member.

In order to provide for energizing of the material 60 so as to effect expansion thereof and corresponding movement of the pin 38 outwardly of the housing, the outer end of the electrode 44 is suitably connected, by means not shown, to a source of electrical power. A second terminal for the material 60 may, of course, be provided in a variety of ways, such as by the use of the actuating member 38 as a terminal, such as in the embodiment of FIG. 1. In this instance, the current from the actuating pin might be transmitted to the material 60 through the force transmitting member 40 by fabricating the same of electrically conductive rubber. However, in the embodiment of FIG. 2, it is preferred to suitably connect the housing 34 to the source of electrical energy to provide for a radial current flow between the side walls of the housing and the central electrode 44. A terminal 37 is provided for this purpose. In order to electrically insulate the actuating member 38 from the device engaged thereby, the outer end of the pin may be provided with a ceramic or plastic insulating cap 62, as shown in FIG. 2.

In a specific embodiment of an actuator constructed as shown in FIG. 2, a response rate on the order of a few milli-seconds was provided, thus making the device particularly useful in situations where high speed actuating is necessary or desirable, such as in emergency cut-off devices. The construction of FIG. 2 further provides for adjustment of the starting temperature of the device. More specifically, it will be observed that inward threading of the metal sleeve 56 will result in a compressive preloading of the deformable solid thermal-responsive material 60 by the piston-like member or movable wall provided by the dished portion of the insulating sleeve 50 in cooperation with the central electrode 44.

Inasmuch as many changes could be made in the above construction and many apparently widely different embodiments of this invention could be made without departing from the scope thereof, it is intended that all matter contained in the above description or shown in the accompanying drawing shall be interpreted as illustrative and not in a limiting sense.

It is also to be understood that the language in the following claims is intended to cover all of the generic and specific features of the invention herein described and all statements of the scope of the invention which, as a matter of language, might be said to fall therebetween.

I claim as my invention:

1. An actuator comprising a housing defining a chamber, a force transmitting member of non-metallic deformable material contained within the housing and having an elongated recess, a reciprocable actuating member slidably engaged in said recess, said deformable member being operative to move said actuating member in a direction longitudinally outwardly of the recess in response to inward deformation thereof, said deformable member being spaced from said housing in directions laterally of the direction of movement of said actuating member, a quantity of electrically conductive thermal-responsive rubber filling the space between the deformable member and housing, and means for connecting said electrically conductive rubber to a source of electrical power.

2. In an actuator of a type having a movable actuating member, a housing at least partially receiving said actuating member, a quantity of solid deformable electrically conductive non-metallic thermal-responsive material contained within said housing in driving relationship with said actuating member, means for connecting said thermal-responsive material to a source of electrical power, said housing having a movable wall for compressively preloading said thermal-responsive material, and means for selectively adjusting the position of said wall.

3. In an actuator of a type having a reciprocable actuating member, an elongated hollow housing, said actuating member extending into one end of said housing, a central electrode extending into the other end of said housing, means closing the other end of said housing including a wall movable longitudinally of the housing and means for selectively positioning said wall, a quantity of solid deformable electrically conductive thermal-responsive material filling the housing between said movable wall and said one end of the housing and being in driving relationship with the portion of said actuating member extending into said housing, and means for connecting said electrically conductive material to a source of electrical power.

4. An actuator comprising an elongated hollow housing closed at one end, a reciprocable actuating member longitudinally extending into said one end of the housing, a central electrode extending into the other end of said housing in alignment with the actuating member, means closing the other end of said housing including a wall movable longitudinally of the housing and means for selectively positioning said wall longitudinally of the housing, a deformable resilient force transmitting sleeve surrounding the portion of the actuating member disposed within said housing, said sleeve being closed at its inner end and being anchored to the housing at its outer end, a quantity of solid deformable electrically conductive thermal-responsive material filling the housing between said movable wall and said inner end of said force transmitting sleeve, and means for connecting said electrically conductive material to a source of electrical power.

5. An actuator having, in combination, a hollow metallic housing having an opening in one end and a generally cylindrical wall defining a chamber, an actuating member having an end slidably extending through said opening into said chamber in coaxial and spaced relationship to said wall, a body of solid, electrically conductive, non-metallic, thermal responsive, and resilient material filling the balance of space within the chamber, said actuating member having an electrically conductive surface portion insulated from the housing within the chamber, and terminal means external to the chamber for connecting a source of current between the housing and said surface portion, whereby the current flows from the actuating member through said body to said wall in a direction radially of the actuating member and the actuating member is urged outwardly from the housing by expansion of said body.

6. An actuator as defined in claim 5, wherein the electrically conductive surface portion of the actuating member is separated from the end thereof within the chamber by a non-conductive portion, whereby the current is interrupted when the actuating member is moved a predetermined distance outwardly from the housing.

References Cited in the file of this patent

UNITED STATES PATENTS

| | | |
|---|---|---|
| 1,314,376 | Swan | Aug. 26, 1919 |
| 2,534,497 | Albright | Dec. 19, 1950 |
| 2,548,708 | Dickey | Apr. 10, 1951 |
| 2,548,941 | Brown | Apr. 17, 1951 |
| 2,928,233 | Kimm | Mar. 15, 1960 |
| 2,932,454 | Dillman | Apr. 12, 1960 |
| 2,941,379 | Nelson | June 21, 1960 |